UNITED STATES PATENT OFFICE.

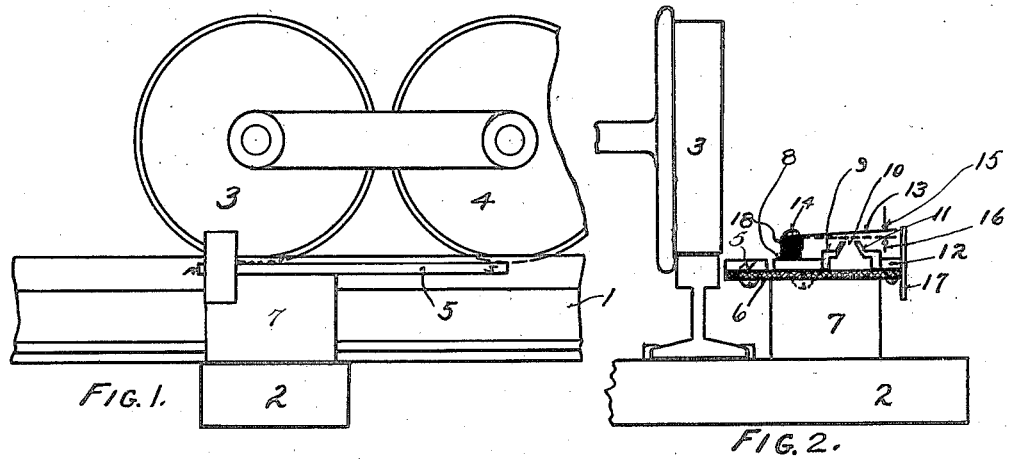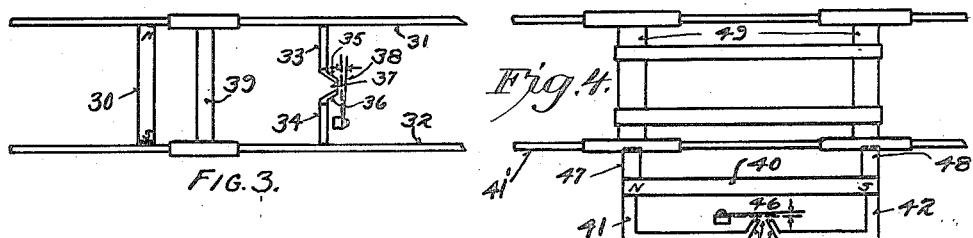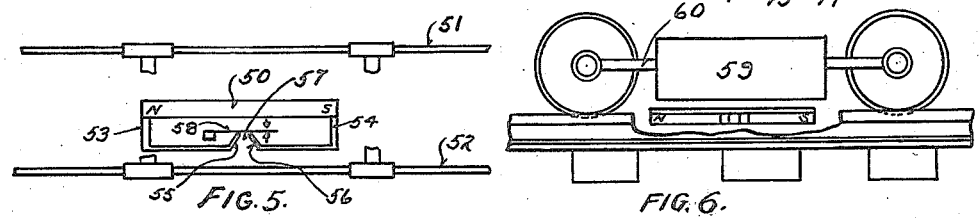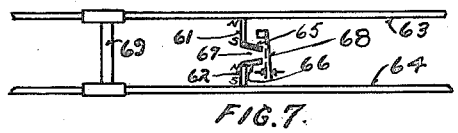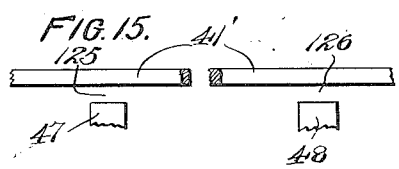

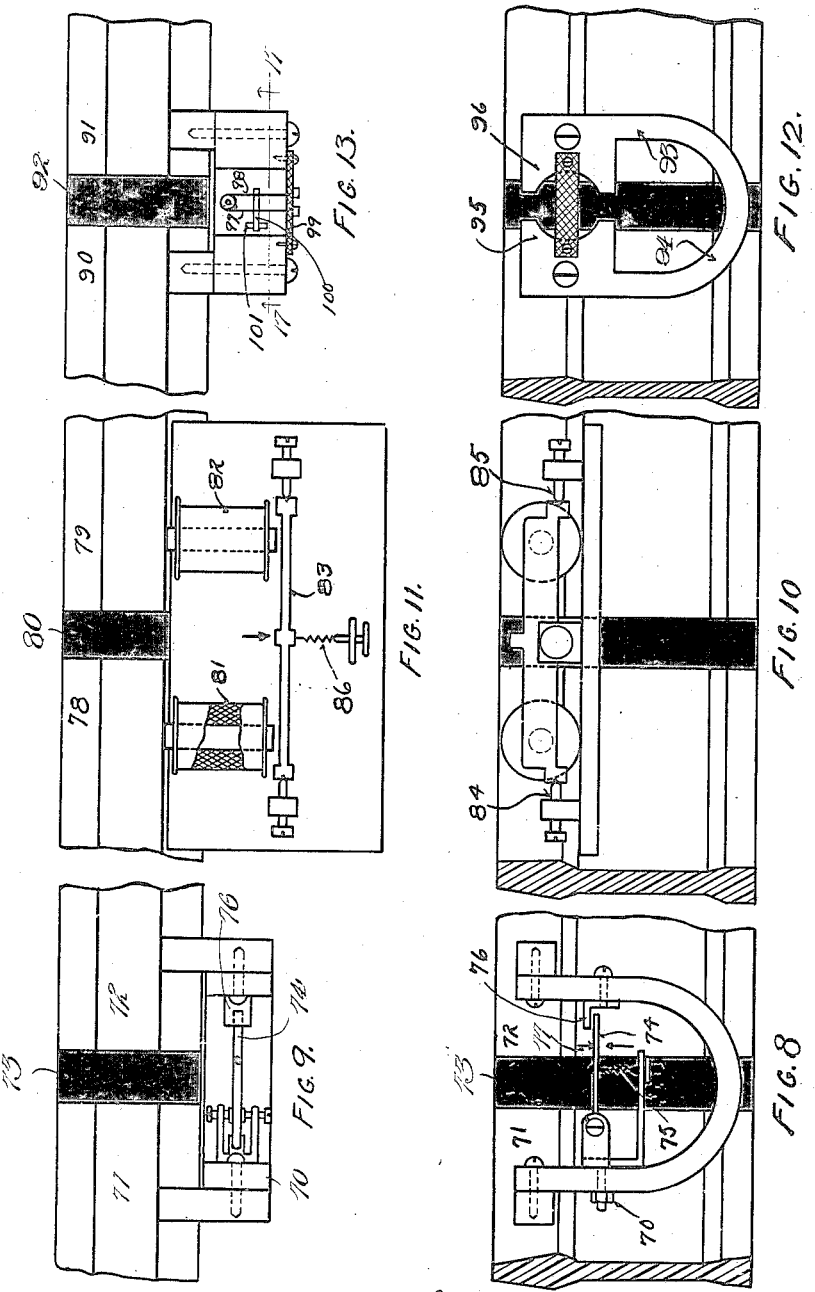

THOMAS W. VARLEY AND WILLIAM C. NEIN, OF NEW YORK, N. Y.

CROSSING-SIGNAL.

1,390,068.  Specification of Letters Patent.  Patented Sept. 6, 1921.

Application filed March 23, 1916, Serial No. 86,145. Renewed February 5, 1921. Serial No. 442,891.

*To all whom it may concern:*

Be it known that we, THOMAS W. VARLEY and WILLIAM C. NEIN, citizens of the United States, and residents of New York, in the county of New York and State of New York, have invented certain new and useful Improvements in Crossing-Signals, of which the following is a specification.

This invention relates to means for indicating at a crossing the approach of a train so that, warning being had, accidents may be avoided.

While the invention is especially adapted for use in connection with crossing signals, it embodies devices controlled by passing trains or vehicles which may be employed in other relations.

One object of the present invention is to provide an improved form of contacting device controlled by a change in magnetic flux produced by the passage of a vehicle, a single wheel in some cases serving to effect the operation.

Another object of the invention is to provide an improved signal system whereby a suitable signal will be placed in operation by the passage of a vehicle by a certain point, and which will be maintained in operation until a certain other point has been reached by the vehicle.

Other and ancillary objects of the invention will appear hereinafter.

In the accompanying drawings which illustrate the invention.

Figure 1 is a diagrammatic view showing in side elevation a vehicle operated contacting apparatus which may be employed to control the signal.

Fig. 2 is an end elevation of the apparatus of Fig. 1.

Fig. 3 is a top plan view of a track and car wheels and axle of a vehicle showing a different form of vehicle controlled contacts.

Fig. 4 is a view similar to Fig. 3 of a still different form of contactor.

Fig. 5 is a top plan view indicating the position of a vehicle on the track, the vehicle being broken away to show a still further modification of the controlling device.

Fig. 6 is a side elevation of the apparatus of Fig. 5.

Fig. 7 is a top plan view of a car track, car wheels, and axle, with a further modification of contacting apparatus.

Fig. 8 is a side elevation showing a still further modified form of vehicle operated contacts.

Fig. 9 is a top plan of the apparatus shown in Fig. 8.

Fig. 10 is a side elevation of another form of contactor.

Fig. 11 is a top plan view of the same.

Fig. 12 is a side elevation of a further form of contactor.

Fig. 13 is a top plan view of the same, and

Fig. 14 is a top plan view of a modification of apparatus showing a still further modification.

Fig. 15 is a top plan view on an enlarged scale of a portion of the apparatus of Fig. 4 showing relation of the pole pieces 47 and 48 to the rail.

Fig. 16 is a section of the conductors 97 and 98 forming the sides of the loop in Fig. 13 on an enlarged scale, on the line 17—17 of Fig. 13, showing the manner of securing the contact arm to the conductors 97 and 98 and its relation to the fixed contact 101.

The contacting devices may be of a structure as shown in Figs. 1 and 2. In these figures 1 represents a rail resting on the tie 2, while 3 and 4 represent the wheels of a car or engine truck resting upon the rail 1, other wheels (not shown) upon the other side of the truck resting upon the other rail of a track (not shown) in a manner which is well understood.

Alongside the rail, but separated therefrom by a gap, is a permanent magnet 5. This magnet may be supported on a brass plate 6 mounted on a wooden block 7 resting upon the tie. The magnetic flux between the poles of this magnet may be transmitted partially through the rail and partially through the area outside the rail. Adjacent one pole of the magnet may be placed a body of iron or other suitable magnetic material 8 having a horn 9 separated by an air gap 10 from a similar horn 11 of the body 12 of magnetic material. Mounted adjacent the air gap 10 is a contact armature or tongue 13, which may be simply a spring steel strip secured at 14 to an insulating block 18 mounted on the magnetic body 8, and biased to normally engage the back contact 15. Upon the other side of the tongue is a forward contact 16 into engagement with which the tongue may be drawn by the magnetic flux between the horns 9 and 11. The tongue is attracted against the forward contact, when it will occupy the position indicated by the dotted line, when the magnetic pull of the tongue is sufficient to overcome its spring. It will be observed that in this position the tongue does not quite contact with the horns. Conversely when the spring is greater than the magnetic pull, the tongue will move into engagement with the back contact. An iron plate 17 may be secured to the magnetic body 12, this increasing the pole face area and facilitating the passage of magnetic flux through the atmosphere from the magnetic body 12 to the more remote pole of the magnet 5, the magnetic circuit of the magnet through this air gap being traced as follows: from pole N of the magnet 5 through the magnetic body 8, horn 9, tongue 13, horn 11, magnetic body 12, plate 17 and atmosphere to the pole S. The apparatus is so adjusted that when there is no vehicle in the vicinity the flux concentrated in the horns 9 and 11 and across the air gap 10, is sufficient to attract the tongue 13 into the dotted line position and against the forward contact. When, however, the vehicle wheel or truck comes opposite the magnet 5, the wheels and axles and portions of the truck being usually made of iron, a path of decreased magnetic reluctance between the magnetic poles will be provided, magnetism will be diverted from the path leading across the horns 9 and 11 and the air gap 10, the tongue 13 will spring away from the horns and the tongue will disengage with the contact 16 and move into engagement with the contact 15. Electrical connection to the tongue may be made by a suitable conductor. The magnetic path provided by the vehicle having been removed by the passage of the vehicle out of operative range, magnetism will again pass between the horns 9 and 11 with sufficient strength to attract the tongue 13. It will now be seen that certain contacts are normally held closed and that the passage of the vehicle alters the magnetic flux of the track device so that the contactor is moved to effect a change in the electrical connections. This may be taken advantage of to set in operation a signal such as a crossing signal or to terminate the operation of the same.

Instead of the device as shown in Figs. 1 and 2, a magnetically controlled contact device as shown in Fig. 3 may be employed. In this arrangement a permanent magnet 30 is arranged transversely of the track between the track rails 31 and 32. Also between the track rails are two iron bars 33 and 34 having horns 35 and 36 separated by an air gap 37 opposite which is a spring steel tongue 38 biased away from the horns arranged in a manner similar to the tongue in the apparatus of Figs. 1 and 2. With the vehicle in a remote position the flux across the gap 37 is normally sufficient to pull the tongue toward the horns. When, however, the vehicle represented by 39, passes the apparatus flux will be diverted from the bodies 33 and 34 and the tongue 38 will move back.

According to the arrangement in Fig. 4, the permanent magnet 40 extends along the rail 41', iron or other suitable magnetic arms 41 and 42 extending from the respective poles of the magnet and having opposed horns 43 and 44 with the gap 45 between them. In operative relation to these horns is a spring steel armature 46 arranged similarly to the armature of Figs. 1 and 2. Between the poles of the magnet and the rail are iron blocks 47 and 48. The blocks 47 and 48 are preferably separated from the rail 41' by gaps 125 and 126, (see Fig. 15) so that the vehicle not being present and therefore the armature 46 attracted, there will be less tendency to shun flux away from the armature by the rail so that the operation of the device is rendered more reliable. Normally sufficient flux from the magnet passes through the horns to attract the armature 46. When, however, a vehicle truck as indicated at 49 passes, flux is diverted from the arms 41 and 42, the horns and the armature so that the armature lets go.

In the device of Figs. 5 and 6 a permanent magnet 50 extends longitudinally of the rails 51 and 52 and is located at a considerable distance from both of them. From the poles of the magnet extend respectively the magnetic arms 53 and 54 having the opposing horns 55 and 56 with the intervening air gap 57 and the tongue of spring steel 58 similar to that described in connection with the preceding figures, arranged in operative proximity to the horns 55 and 56. Normally, that is with no vehicle in the vicinity, the magnetism across the horns is sufficient to attract the tongue. When the magnetic mass of suitable proportions carried by the vehicle passes the device, however, magnetism is shunted out of the arms 53 and 54 and their horns and the armature 58 is let go. This magnetic mass may be any of the masses carried on vehicles as for instance motor casing, etc., or it might be a block of iron 59 carried on the vehicle 60 for the express purpose of affecting the magnetic track device. When no vehicle is present, magnetism passes from the N pole of the magnet 50 through the arm 53, horn 55, tongue 58, horn 56 and arm 54 to the S pole of the magnet. When, however, a magnetic body on a vehicle such as the block 59 is in proximity to the magnet 50, another magnetic circuit is provided from the N pole of the magnet through the air gap to one end of the block 59, through the block 59 and through the air gap to the S pole of the magnet. The entry of this large mass of magnetic material into the field of the magnet and providing a shunt path for the magnetism to pass from one pole of the magnet to the other independently of the horns 55 and 56, causes sufficient magnetism to be diverted so that the magnetism through the horns is no longer sufficient to attract the steel armature, which thereupon is released.

In Fig. 7 is shown the arrangement wherein two permanent magnets 61 and 62 extend between the track rails 63 and 64. Each of these magnets carries a horn 65 and 66 of magnetic material extending longitudinally of the track, separated by an air gap 67 and adapted to exert an attractive influence on the spring steel tongue 68. Normally this attraction would be insufficient to pull the tongue toward the horns against its bias, but upon the passage of a vehicle as indicated by 69, the exterior magnetic circuit of the magnets is improved, that is to say, its reluctance is decreased whereupon the magnetism across the horns 65 and 66 is increased sufficiently to attract the tongue.

In the device of Figs. 8 and 9 a horse-shoe shaped permanent magnet 70 is secured to rail ends 71 and 72 between which is an insulated section 73. Between the poles of the magnet is mounted a pivoted magnetic tongue 74. This tongue tends to be retracted by the spring 75. Magnetism, however, passes through the tongue 74 and into the magnetic stop 76 so that there is a magnetic attraction tending to draw the armature against the stop. It is prevented, however from touching the stop by its forward contact 77. Normally therefore, that is with no vehicle in the vicinity, the armature is magnetically attracted against its forward stop. If, however, the magnetic gap 73 is bridged by a car wheel or other part carried by the vehicle, magnetism is shunted from the armature and it is retracted by the spring against the back contact.

In the arrangement of Figs. 10 and 11, the rail ends 78 and 79 are separated by an insulated section 80. To the rail 78 is presented one pole of electromagnet 81 and similarly a pole of electromagnet 82 is presented to the rail 79. The other poles of these electromagnets are presented to armature 83 pivoted at 84 and 85 and retracted by a spring 86. Suitable arrangements of forward and back contacts for engagement and disengagement by the armature when retracted by the spring and attracted by the magnets are provided in a well known manner. The electromagnets are normally energized to an extent insufficient to attract the armature. When, however, the gap 80 is magnetically bridged by the passage of a vehicle the magnetic circuit is so improved that the magnetism is increased sufficiently to attract the armature.

In the apparatus of Figs. 12 and 13, the track rail ends 90 and 91 are separated by an insulated section 92. Secured to the rail ends is a magnet 93. This magnet may be of a well known form having the horseshoe portion 94 with the pole faces 95 and 96. Between the pole faces 95 and 96 is a looped conductor having its sides 97 and 98 extending substantially axially of the cavity between the faces 95 and 96, and having its ends fixed to the bar 99. A movable contact 100 is secured to the loop sides 97 and 98 and is adapted to be moved into and out of engagement with the fixed contact 101. In the normal condition, namely with no vehicle in the vicinity, the loop sides 97 and 98 will occupy a certain position in the field between the pole faces. Upon the passage of a vehicle, however, a certain amount of flux will be shunted from between the pole faces 95 and 96. This change in flux will induce current in the conductor loop. This will develop motor action of the loop sides in the field, one moving in one direction and the other moving in the other direction. This will result in the movement of the contact 100 so that it will move to engage or disengage the contacts.

Referring now to Fig. 14, 110 and 111 indicate the usual iron or steel track rails. In this arrangement the contacting device has a permanent magnet 112 with one pole adjacent to the rail 111 but, instead of extending along the rail as in Figs. 1 and 2, the magnet here extends at an angle, shown as a right angle to the rail 111. Adjacent the pole near the rail are arranged the magnetic members 113 and 114 which carry the horns 115 and 116 between which is the air gap 117 bridged by the spring armature 118 of magnetic material such as a steel spring and which controls the contacts 119 and 120. Normally, that is when the vehicle is remote from the device, the magnetism passes between the horns in sufficient amount to attract the armature 118. When, however, a vehicle passes, magnetism emanating from the adjacent pole of the magnet will be diverted from the horns and air gap so that the field through the armature will be weakened to such an extent that the armature will be retracted by its spring against its back contact. When no vehicle is present, the path of the magnetism through the instrument is from the N pole of the magnet through the magnet member 113, the horn 115, the spring armature 118, the horn 116, the magnet member 114 and hence through the atmosphere to the S pole of the magnet. When, however, a vehicle is in the position as shown in the drawing, there is a magnetic circuit of relatively small reluctance formed from the N pole of the magnet through the wheel of the vehicle and the atmosphere to the S pole of the magnet. This last path is in shunt to the path just traced through the horns 115 and 116 and the introduction of this large mass of magnetic material operates to divert magnetism from this path, including these horns, to such an extent that the spring armature 118 is released and the contacts operated accordingly.

While the invention has been illustrated in a number of what are considered to be its best applications, it may have other embodiments without departing from its spirit and is not, therefore, limited to the structures shown in the drawings.

What we claim as new, and desire to secure by Letters Patent is:—

1. In a contact device, the combination with a railway track extending along a fixed right of way, of a magnet extending along a rail of said track, magnetic members, having a gap between them, extending at an angle from said magnet, a magnetic armature across said gap and contacts controlled by said armature.

2. In a contact device, the combination with a railway track extending along a fixed right of way, of a magnet extending along a rail of said track, magnetic members, having a gap between them, extending at an angle from said magnet, a magnetic armature across said gap and contacts controlled by said armature, said members extending upon the opposite side of said magnet from said rail.

3. In a contact device, the combination with a railway track extending along a fixed right of way, of a magnet extending along a rail of said track, magnetic members having horns with a gap between them, said members extending at an angle from said magnet, a magnetic armature across said horns and contacts controlled by said armature.

4. In a contact device, the combination with a railway track extending along a fixed right of way, of a permanent magnet extending along a rail of said track, magnetic members, having a gap between them, extending at an angle from said magnet, a magnetic armature across said gap and contacts controlled by said armature.

5. In a contact device, the combination with a railway track extending along a fixed right of way, of a magnet extending along a rail of said track, magnetic members extending from the two poles of said magnet respectively, said members having a gap between them, a magnetic armature across said gap, and contacts controlled by said armature.

6. In a contact device, the combination with a railway track extending along a fixed right of way, of a magnet extending along a rail of said track on the outer side of said rail, magnetic members, having a gap between them, extending at an angle from said magnet, a magnetic armature across said gap and contacts controlled by said armature.

7. In a contact device, the combination with a railway track extending along a fixed right of way, of a magnet extending along a rail of said track, upon the outer side thereof, magnetic members extending from the two poles of said magnet respectively, said members having a gap between them, a magnetic member across said gap, and contacts controlled by said armature.

Signed at New York in the county of New York, and State of New York, this 22nd day of March A. D. 1916.

THOMAS W. VARLEY.
WILLIAM C. NEIN.